Aug. 7, 1945.   M. J. E. GOLAY   2,381,443
ANTIAIRCRAFT FLARE
Filed May 19, 1941
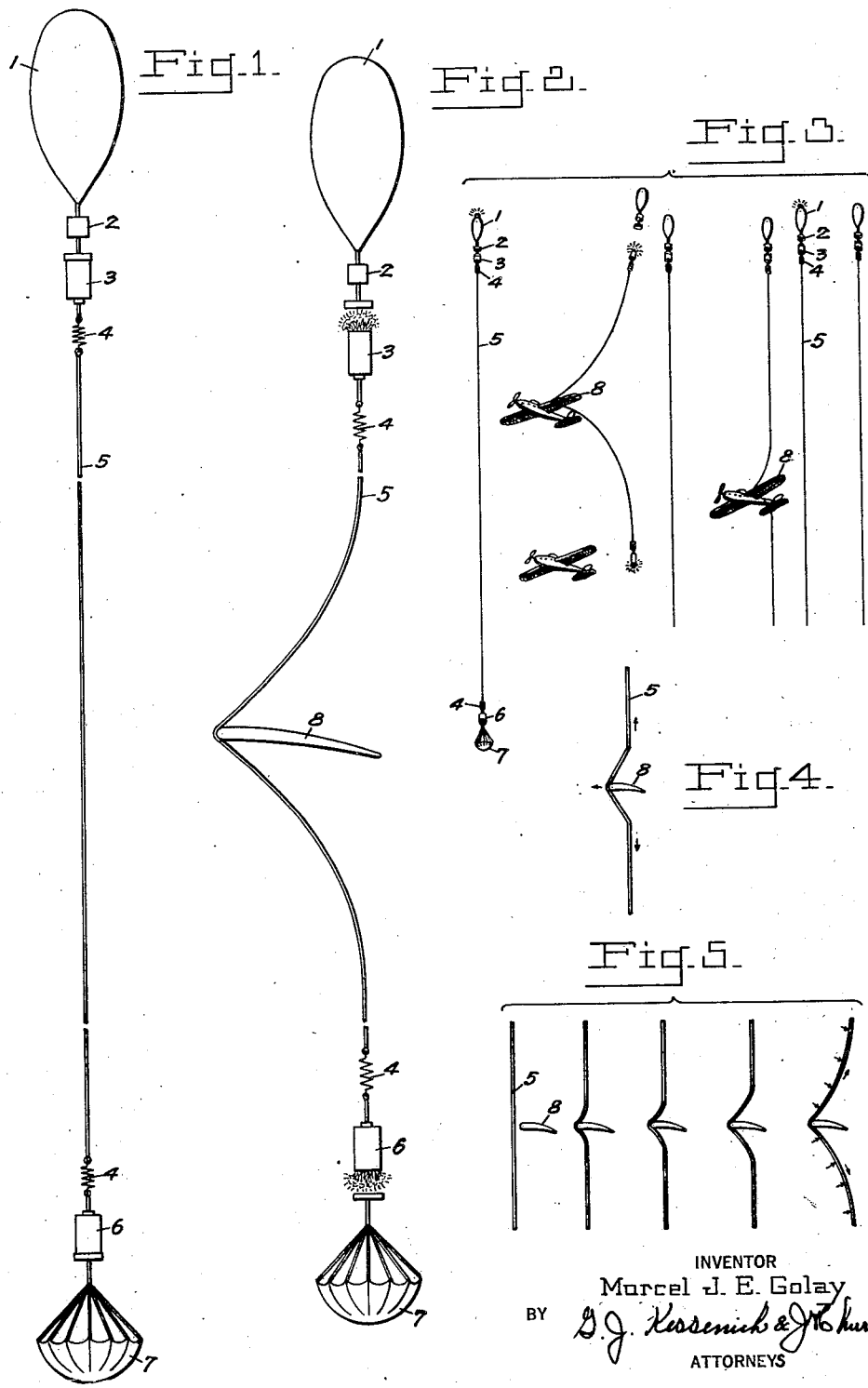
INVENTOR
Marcel J. E. Golay
BY
ATTORNEYS Patented Aug. 7, 1945

2,381,443

UNITED STATES PATENT OFFICE 2,381,443

ANTIAIRCRAFT FLARE

Marcel J. E. Golay, Long Branch, N. J.

Application May 19, 1941, Serial No. 394,234

6 Claims. (Cl. 102—37.1)

(Granted under the act of March 3, 1883, as amended April 30, 1928; 370 O. G. 757)

The invention described herein may be manufactured and used by or for the Government for governmental purposes, without the payment to me of any royalty thereon.

While it is realized that it has been often proposed to place entanglements in the path of aircraft for the purpose of enmeshing or destroying the same, it is proposed in this invention to provide means for illuminating the area immediately surrounding the plane by a flare supported by a special suspension means.

It is the object of this invention to provide means for aiding friendly combat planes and antiaircraft artillery by rendering visible the path taken by enemy aircraft at night.

It is a further object of the invention to produce a telltale flare which can be distributed in larger numbers in the path of enemy aircraft and will by engagement with some portion of the enemy aircraft be ignited and carried in its wake to indicate the path followed by such craft.

It is a further object to produce a telltale flare for spotting aircraft which can be employed economically and in large quantities.

The specific nature of the invention as well as other objects and advantages thereof will clearly appear from a description of a preferred embodiment as shown in the accompanying drawing in which:

Figures 1 and 2 are diagrammatic views of the devices of this application.

Figure 3 is a diagrammatic view showing a plurality of the devices in the path of a squadron of enemy aircraft.

Figures 4 and 5 are diagrammatic views illustrating the effects caused by striking wires suspended, respectively, in vacuo and in air.

Basically the idea consists in suspending a flare or flares from a balloon or parachute by means of a long filament of light weight adapted to be carried away by engagement with some part of a plane and to light the telltale flare and cause it to be carried in the wake of the plane.

Specifically Figure 1 shows a balloon 1 which may be provided with altitude control equipment 2 and from which a flare 3 is suspended. By means of a resilient connection 4, either a coiled spring or rubber shock cord, a filament 5 is attached to the flare. This filament which may be of any light elastic material, for example Nylon, carries on its lower end an additional flare 6, likewise resiliently attached. Each of the flares is provided with a suitable ignition device responsive to abnormal tension on the wire and the lower flare may have a wind brake 7 to resist any sudden motion of the flare body. Upon engagement of the filament with some portion of the aircraft, as a wing 8, the flare bodies will tend to be drawn into the wake of the aircraft. As the balloon and wind brake resist this motion, a strain will be placed on the filament causing it to actuate the ignition devices. Upon ignition, the parts of the flare to which the balloon and wind brake are attached may be discharged from the flare allowing the flares to be carried with the aircraft as shown diagrammatically in Figs. 2 and 3.

Figure 3 shows a network of the telltale flares suspended in the air in the path of an enemy formation. One or more of the balloons may be provided with a continuously burning light to serve as a reference point.

Balloons when used as the supporting means have the obvious advantage that they can be set to remain at a predetermined altitude by means of barometrically controlled valves or other known means. In certain tactical situations it might be desirable to establish a curtain of the detecting devices sooner than would be practical if a larger number of balloons were to be launched individually. In such a case, parachute supported telltale flares could be quickly distributed by a patrolling plane and a protective net established which would remain in place long enough to allow balloon flares to be launched and to rise to the desired level. Meteorological considerations and the technical characteristics of either system would necessarily condition the tactical use of such weapons.

The factors involved in the selection of an adequate flare are that they must be capable of being readily seen by the unaided eye at a distance of several miles and that they must be capable of burning for from one to five minutes. The weight of such flares should be kept at a minimum, probably at or near one ounce. A suitable igniting device would be one quickly responsive to any tension in the supporting line greatly beyond that due to the normal static loads imposed by the weight of the flares themselves. Such an igniting device could be found, for example, in a friction primer of the type employed in U. S. Patent No. 1,709,644 which should be so assembled that the normal static loads due to the weight of the various elements would be insufficient to move the friction unit. A suitable wind brake on the lower flare and the balloon or parachute supporting the upper flare are attached to parts of the flares which are discarded on ignition leaving the ignited flares joined by the filament. Similarly the cover at the extreme end of the flare could be provided with a friction element cooperating with an igniter in the flare body to produce ignition when the cover is pulled off. Any simple means could be provided to insure that the cover will not be pulled off until a predetermined tension is reached. It is also contemplated that the balloon itself may be ignited at the same time as the flares.

Figures 4 and 5 are diagrams which will serve to illustrate the theoretical considerations involved in the selection of the means for suspending the flares.

The mechanical properties of a suitable wire are fairly well suggested by the following considerations. First, assume an infinitely long wire in vacuo which is struck normally to itself by the wing of an airplane travelling at high speed. (See Figure 4.) The problem thus stated has a readily obtainable solution which can be described with sufficient approximation as follows: An impulse will travel in both directions along the wire with the velocity of sound in the particular material this wire is made of. Within the portion of the wire over which this impulse has traveled a certain tension has been created. Furthermore, the two kinks of the wire will travel outwards with a velocity in between that of the plane and that of the initial impulse. The actual computations indicated that the tension thus created in a length of piano wire struck at a speed of 200 miles per hour amounts to a quarter of the tensile strength of this particular material.

The treatment of the hypothetical case of a wire placed in vacuo and struck normally serves to give a picture of what will happen in the air immediately after impact. However, as an increasing length of wire is carried along at high speed, the air resistance against this portion of the wire will become more and more appreciable, and a condition will obtain eventually in which the wire is forced by the air resistance to slide around over a virtual air cushion, as indicated by the diagram of Figure 5. Under this condition the tension of the wire will be approximately that created by pulling suddenly one end of the wire with the speed of the plane. This would cause a considerably higher tension which piano wire could not withstand. Fortunately, materials are available which, albeit having a lower tensile strength than steel, are sufficiently lighter and more extensible as to withstand such a shock. One of these materials is the synthetic, polymeric amide commonly known as "Nylon" which in the form of continuous filaments or as twisted cord is extremely tough and elastic. In the circumstances just described, Nylon would be strained to half its tensile strength. To this tension must be added that due to skin friction of the air, a factor important enough to warrant reckoning, yet not of an order of magnitude to be prohibitive. Furthermore, it will be recalled that increasing the cross-section of the wire will cause an almost proportional increase of its strength, whereas the air drag will increase much less rapidly. This indicates that larger cross-sections can be chosen to offset the disadvantage of the air drag due to skin friction. On the other side, it will also be recalled that wires of finite length are considered (2000 to 5000 feet), whereas the tension just calculated was for an infinitely long wire. For a wire of finite length and dynamically free at both ends (the flares may be attached through resilient connections) the initial impulse propagated along the wire at high speed will be reflected at the end of the wire with a change of phase and will release the tension of the wire as it travels back towards the point of impact. If conditions rule out the use of any available material in very long and very thin lengths, sectionalized wires of larger cross-section may yet be considered in which each section carries its own flare and is designed to break loose from the other sections after impact.

The invention may be practiced either by releasing the balloons from ground stations at intervals of a few hundred feet across the probable directions of approach of enemy aircraft or in certain situations by releasing parachute supported telltale flares from a patrolling plane across the path of enemy squadrons. Such a barrier should serve to intercept one or more planes of most formations thus disclosing their movements to antiaircraft gunners and friendly fighter craft. Owing to the light weight of the device and the nature of the igniting means employed, no danger is presented by their use in large numbers over friendly territory. In all probability many of the constituent parts of those devices which fail to engage enemy aircraft can be recovered in condition for use at a later date.

While I have shown a preferred embodiment of the invention, it will be obvious that changes may be made in the construction and arrangement of the parts without departing from the spirit of the invention.

I claim:

1. A telltale device for detecting the movements of aircraft comprising a flare, air-borne supporting means therefor, a long, elastic filament attached at one of its ends to said flare and adapted to be extended outwardly therefrom in the atmosphere for ensnaring a passing aircraft, release means normally securing said flare to said supporting means and adapted to permit the flare to be disconnected from the supporting means and towed by the filament in the wake of a passing aircraft upon engagement of said aircraft with said filament, and means for igniting said flare upon its release from said supporting means.

2. A telltale device for detecting the movements of aircraft comprising a flare, air-borne supporting means therefor, a long filament of a synthetic polymeric amide attached at one of its ends to said flare and adapted to be extended outwardly therefrom in the atmosphere for ensnaring a passing aircraft, release means normally securing said flare to said supporting means and adapted to permit the flare to be disconnected from the supporting means and towed by the filament in the wake of a passing aircraft upon engagement of said aircraft with said filament, and means for igniting said flare upon its release from said supporting means.

3. A telltale device for detecting the movements of aircraft comprising a balloon, a flare detachably suspended from said balloon, a long, elastic filament resiliently attached to and suspended from said flare, a second flare resiliently attached to and suspended from said filament, a wind-brake detachably suspended from said second flare, and means for igniting said flares responsive to detachment thereof from said balloon and wind-brake.

4. A telltale device for detecting the movements of aircraft comprising a balloon, means for controlling the altitude of the balloon, a flare detachably suspended from said balloon, a long filament of a synthetic polymeric amide resiliently attached to and suspended from said flare, a second flare resiliently attached to and suspended from said filament, an inverted parachute detachably suspended from said second flare, and means for igniting said flares response to detachment thereof from said balloon and inverted parachute.

5. In a telltale device for detecting the movements of aircraft, a pair of illuminating flares, a long, elastic filament connecting the flares and adapted to be extended in the atmosphere for ensnaring a passing aircraft, and igniting means adapted to ignite the flares on engagement of the extended filament with an aircraft.

6. In a telltale device for detecting the movements of aircraft, a pair of illuminating flares, a long filament of a synthetic polymeric amide connecting the flares and adapted to be extended in the atmosphere for ensnaring a passing aircraft, and igniting means adapted to ignite the flares on engagement of the extended filament with an aircraft.

MARCEL J. E. GOLAY.